Oct. 27, 1959    G. W. BROWN ET AL    2,909,968
COLLATING APPARATUS
Filed July 30, 1956    14 Sheets-Sheet 1
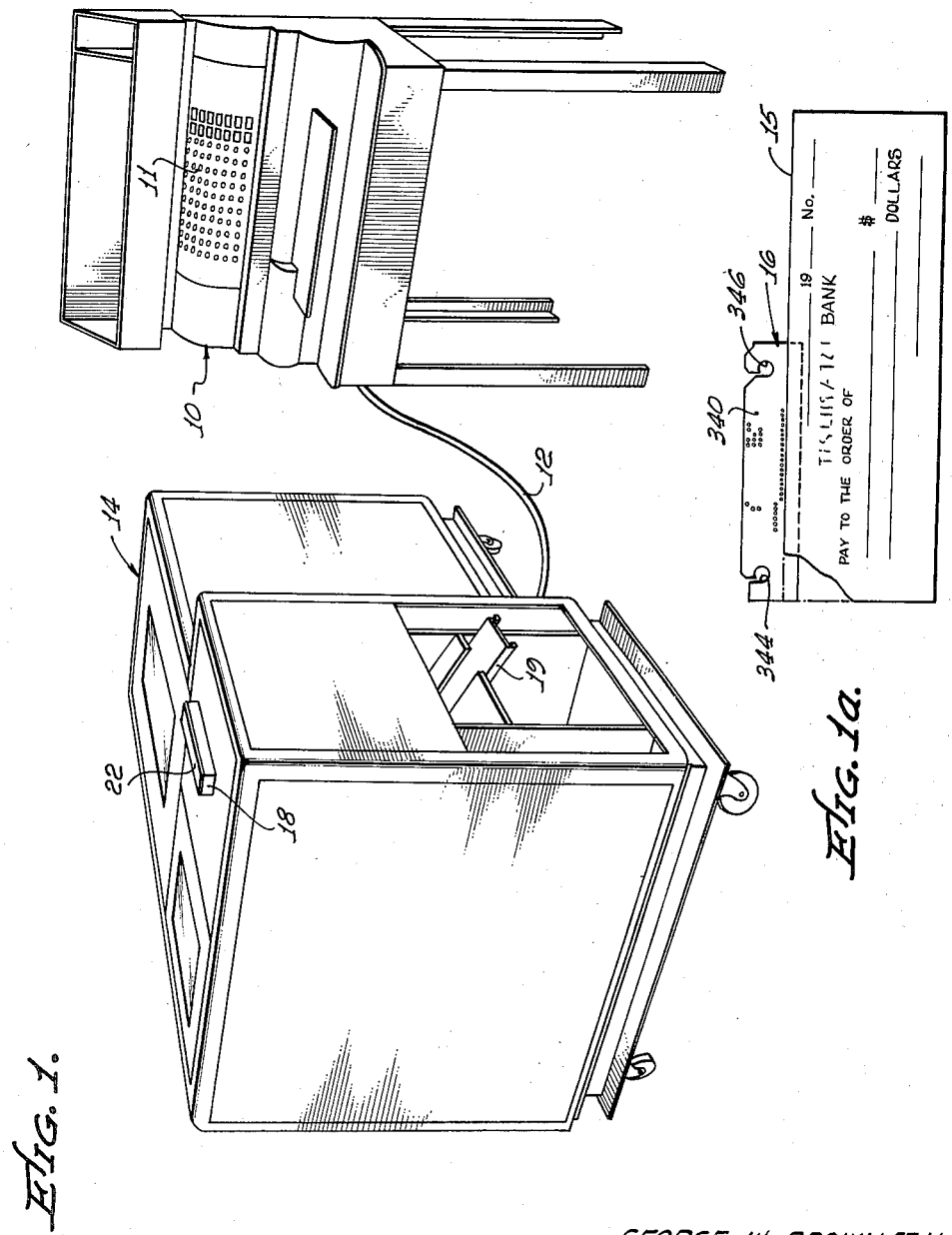
GEORGE W. BROWN ET AL
INVENTORS
BY Lyon & Lyon
ATTORNEYS

GEORGE W. BROWN ET AL
INVENTORS

BY Lyon & Lyon
ATTORNEYS

Oct. 27, 1959    G. W. BROWN ET AL    2,909,968
COLLATING APPARATUS
Filed July 30, 1956    14 Sheets-Sheet 3

GEORGE W. BROWN ET AL
INVENTORS

BY  *Lyon + Lyon*
ATTORNEYS

Oct. 27, 1959

G. W. BROWN ET AL 2,909,968

COLLATING APPARATUS

Filed July 30, 1956

GEORGE W. BROWN ET AL
INVENTORS

BY Lyon&Lyon

ATTORNEYS

Oct. 27, 1959   G. W. BROWN ET AL   2,909,968
COLLATING APPARATUS
Filed July 30, 1956   14 Sheets-Sheet 5
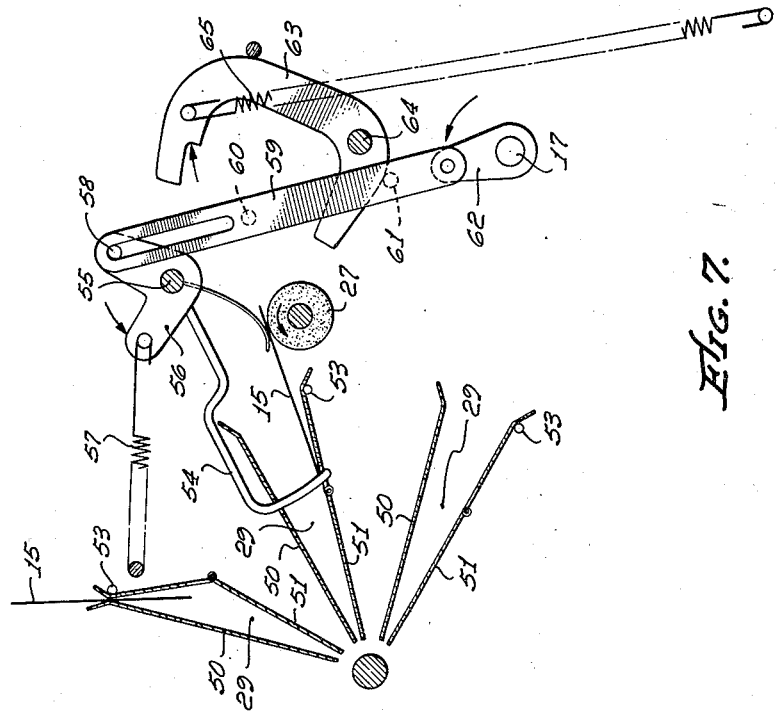
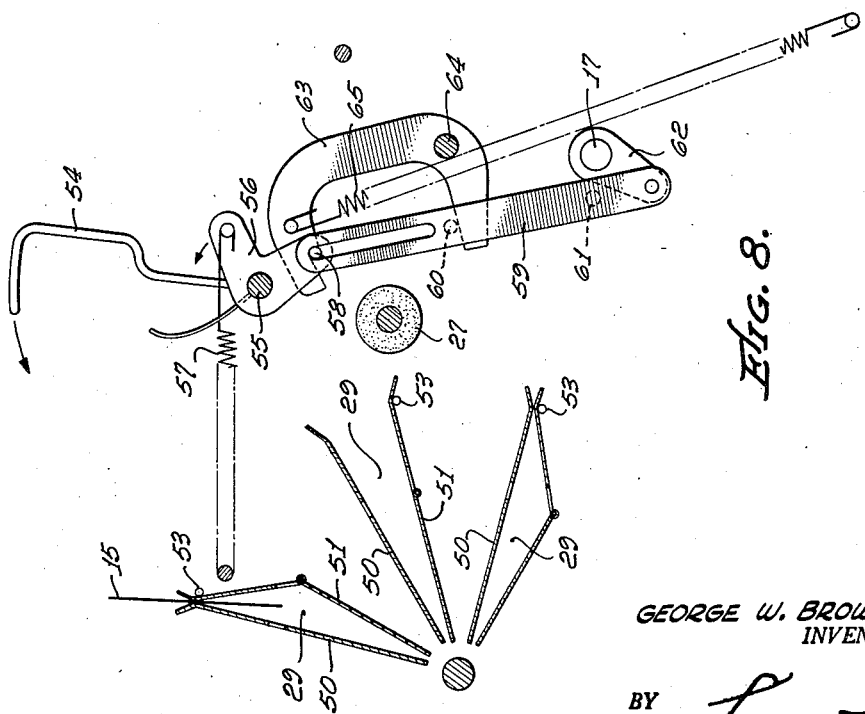
GEORGE W. BROWN ET AL
INVENTORS
BY Lyon & Lyon
ATTORNEYS

GEORGE W. BROWN ET AL
INVENTORS

BY Lyon & Lyon
ATTORNEYS

Oct. 27, 1959    G. W. BROWN ET AL    2,909,968
COLLATING APPARATUS

Filed July 30, 1956    14 Sheets-Sheet 7

GEORGE W. BROWN ET AL
INVENTORS

BY Lyon&Lyon
ATTORNEYS

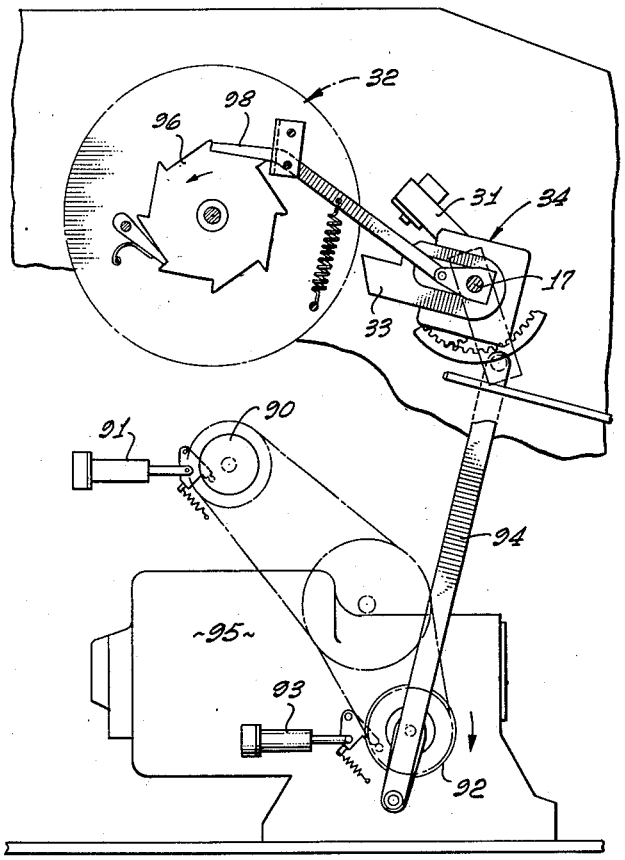
Fig. 14.
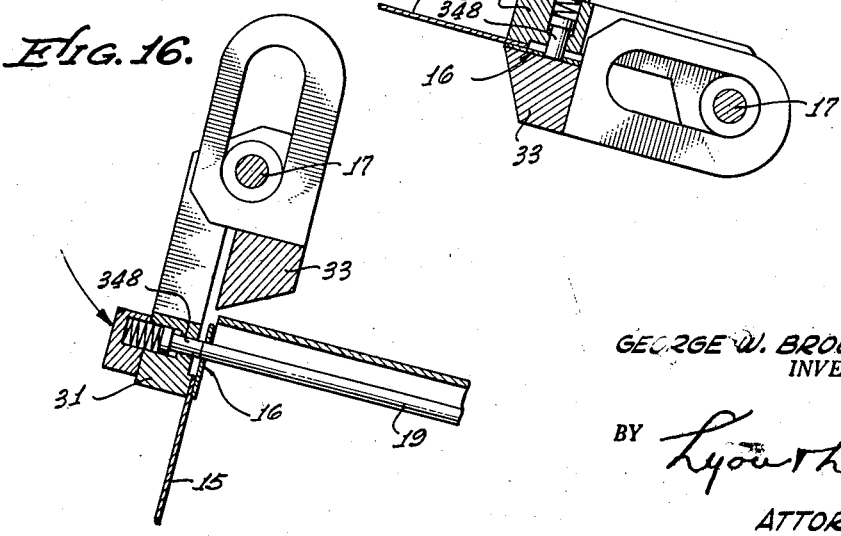
Fig. 15.
Fig. 16.
GEORGE W. BROWN ET AL
INVENTORS

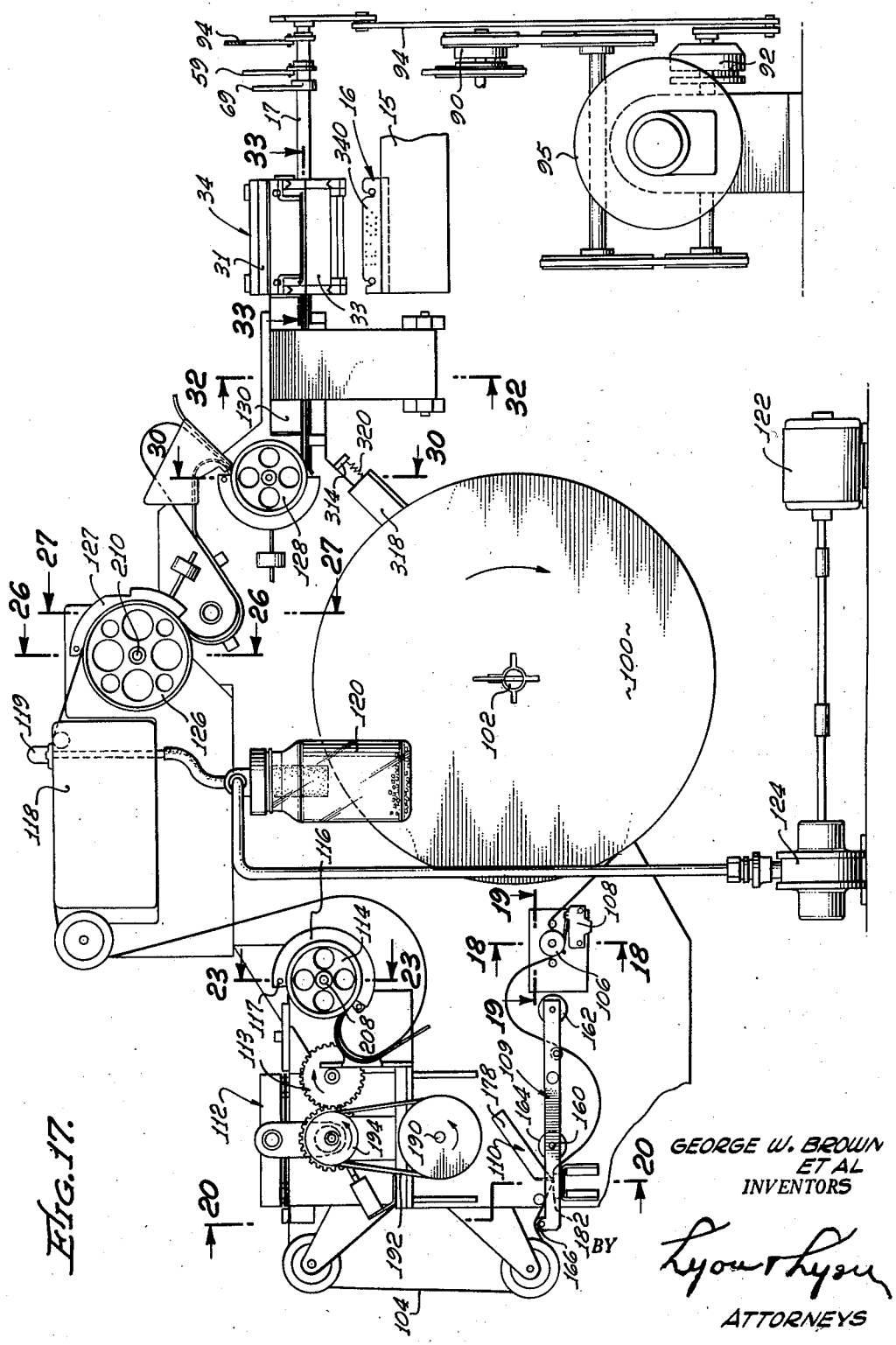

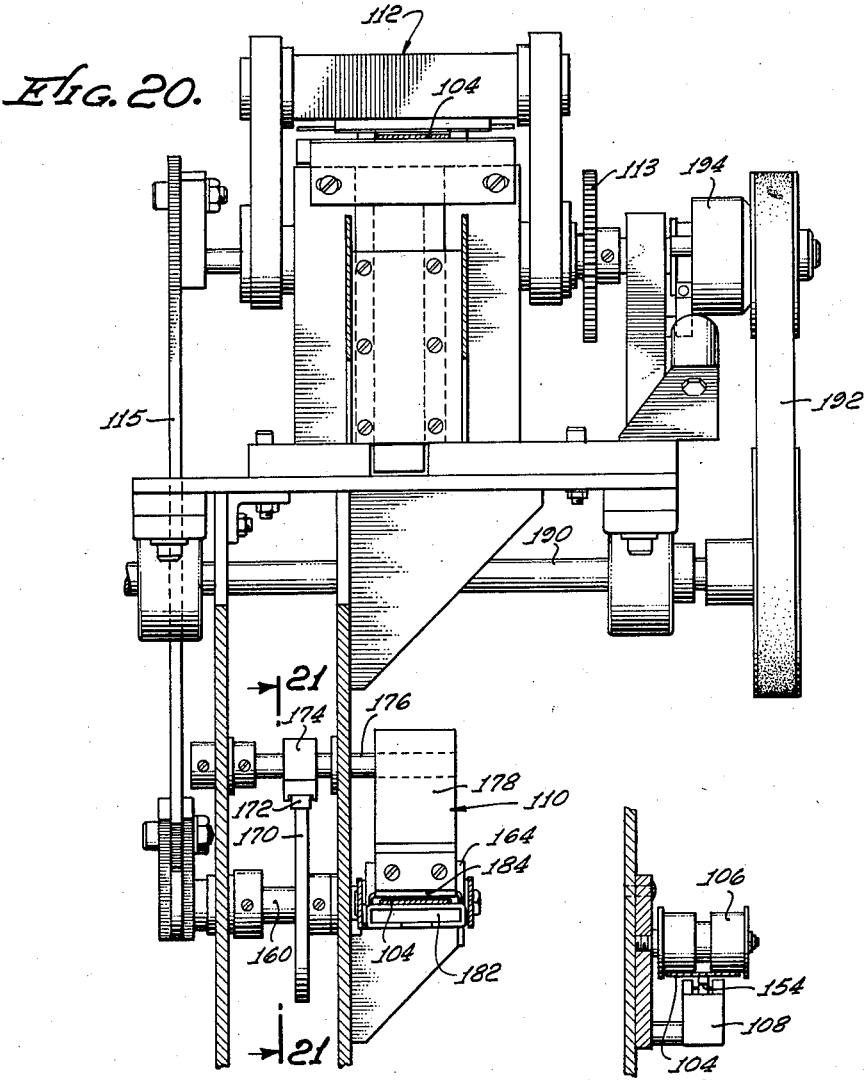

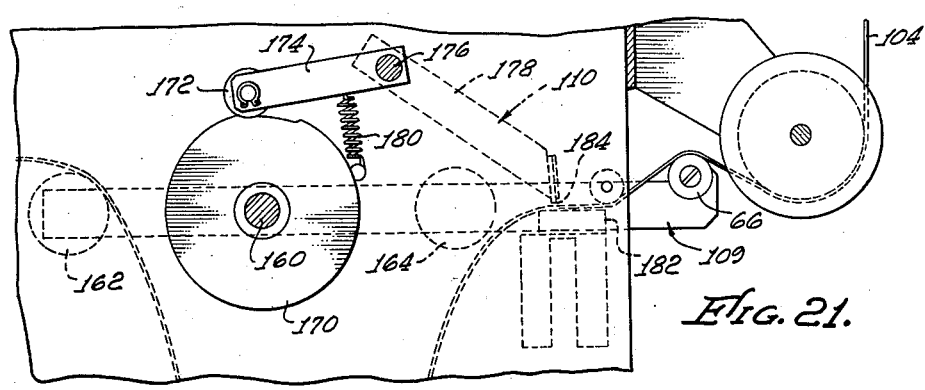
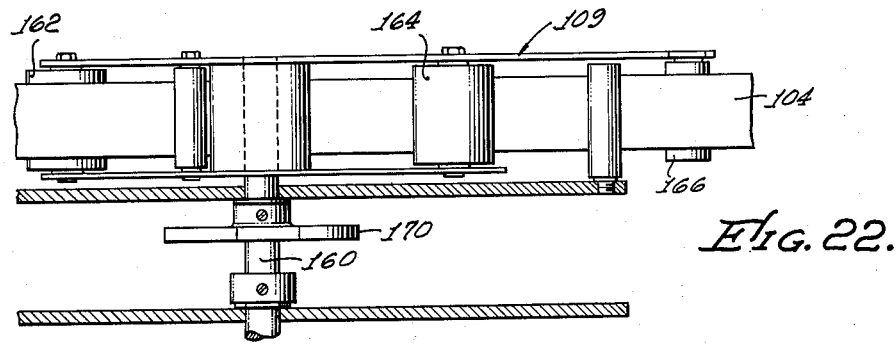
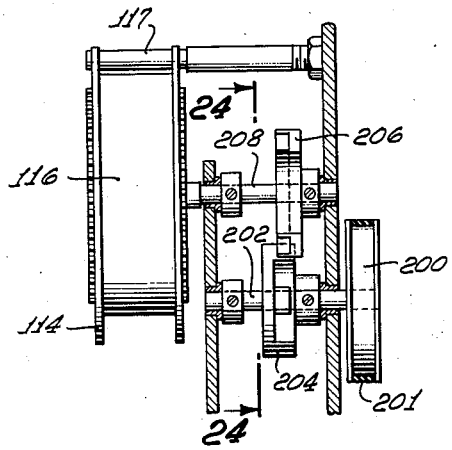
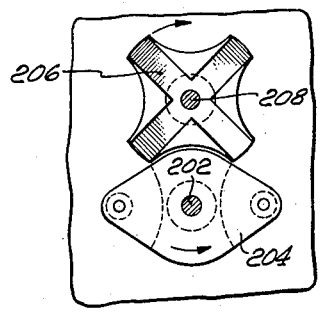

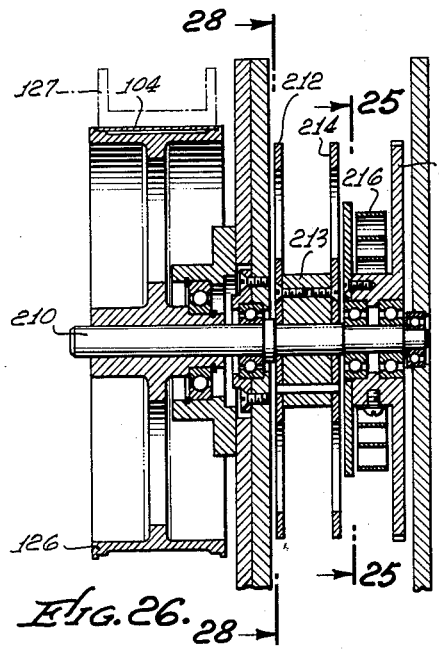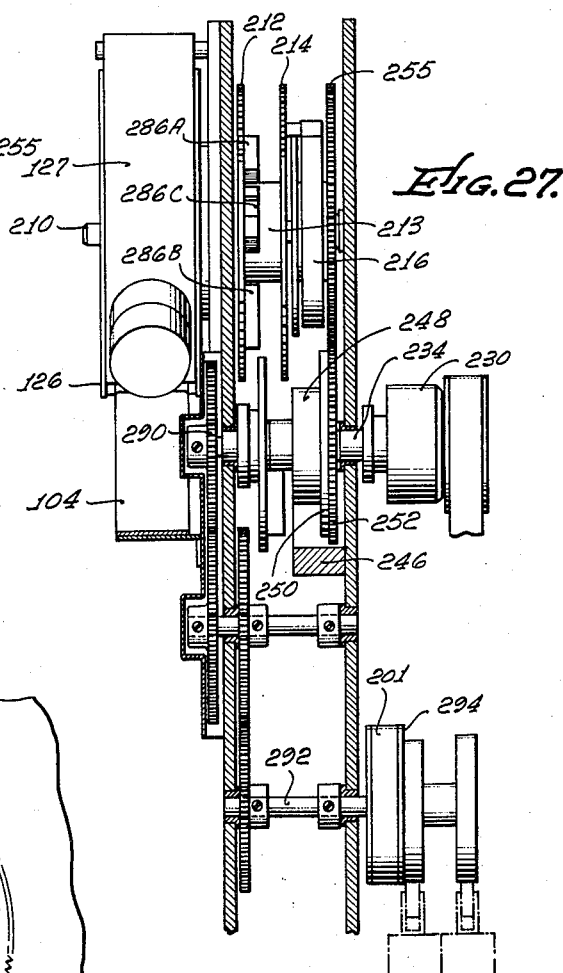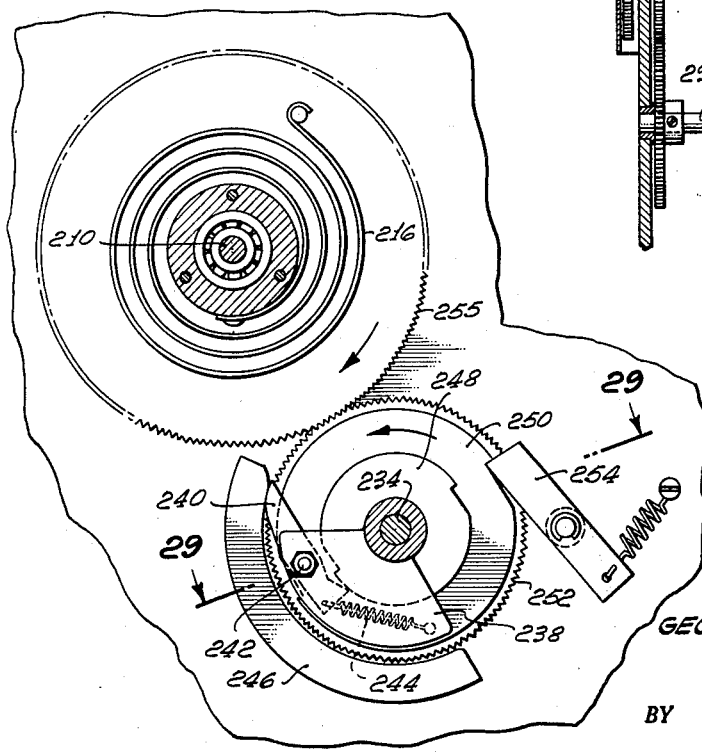

Oct. 27, 1959        G. W. BROWN ET AL        2,909,968
COLLATING APPARATUS
Filed July 30, 1956        14 Sheets-Sheet 13

GEORGE W. BROWN ET AL
INVENTORS
BY
ATTORNEYS

Oct. 27, 1959
G. W. BROWN ET AL
2,909,968
COLLATING APPARATUS
Filed July 30, 1956
14 Sheets-Sheet 14
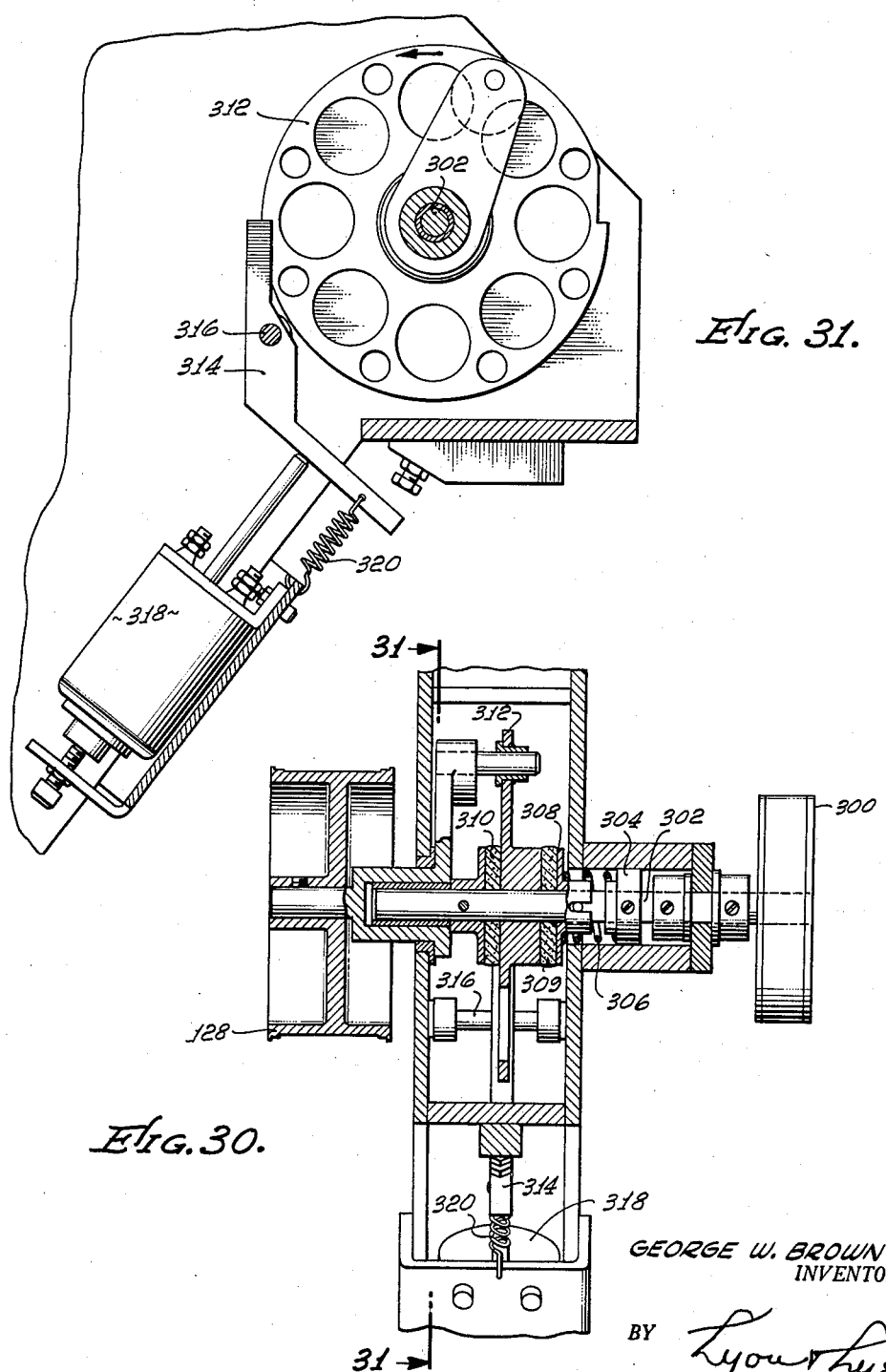
GEORGE W. BROWN ET AL
INVENTORS
BY
ATTORNEYS United States Patent Office 2,909,968
Patented Oct. 27, 1959

2,909,968

COLLATING APPARATUS

George W. Brown, Pacific Palisades, Conrad Y. Cartwright, Northridge, George L. Hutter, Redondo Beach, Farrell A. McCann, Hawthorne, John C. Nyberg, North Hollywood, Roy M. Skeirik, Van Nuys, and Niels Krag, Pacific Palisades, Calif., assignors, by mesne assignments, to Telemeter Magnetics, Inc., Los Angeles, Calif., a corporation of New York Application July 30, 1956, Serial No. 600,940

8 Claims. (Cl. 93—1)

This invention relates to apparatus for processing data and, more particularly, to a system wherein data is perforated in a tab in a coded form and the tab is then adhered to the document from which the data was derived.

In an application, which is assigned to a common assignee, for a Computing System, by George W. Brown and Louis N. Ridenour, Serial No. 321,452, filed November 19, 1952, there is described and claimed a system for handling the data on documents such as checks automatically as well as for automatically handling the checks themselves by transferring the data written in human language on the check to a tab in the form of code perforations, which is machine language, and affixing the tab to the check. Thereafter, both check and tab may be handled or processed automatically from the machine-language data which is on the tab. An improved tab is described and claimed in an application for a Computing System, by Peter Van Horne Serrell, Serial No. 456,960, filed September 20, 1954, issued as Patent No. 2,848,163, dated August 19, 1958, which is assigned to a common assignee. Apparatus for affixing a tab to a check is described and claimed in an application for a Tab-Affixing Device, by George James Brown, which is assigned to a common assignee, and bears Serial No. 457,248, and was filed September 20, 1954, issued as Patent No. 2,808,871, dated October 8, 1957.

An object of the present invention is the provision of apparatus for making tabs from a reel of tape, writing coded data therein from a document, such as a check, and mating the finished tab with the check from which the data on the tab was derived.

Another object of the present invention is the provision of novel apparatus for writing coded data on tabs from checks and mating a tab with the check from which the data was derived.

Yet another object of the present invention is the provision of useful apparatus for enabling the rapid and automatic production of tabs bearing coded data derived from documents and the proper alignment with each document for affixation thereto of the proper tab.

These and other objects of the invention are achieved by providing apparatus wherein the data written on a document is entered into the embodiment of the invention by means of a keyboard. A reel of paper tape supplies the material which is perforated by the apparatus to form a tab and has holes punched therein to represent the data in coded form. The document is dropped into a portion of the apparatus which includes a pocket drum wherein the document is aligned and rotatably advanced to be brought into proper alignment for affixation thereto of the tab bearing the coded data derived from that document.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a perspective drawing of the embodiment of the invention as it appears within its protective covers;

Figure 1A is a plan view of a check with a tab affixed thereto;

Figures 7 and 8 are details of stop fingers which preliminarily position a check at the loading position;

Figure 17A:
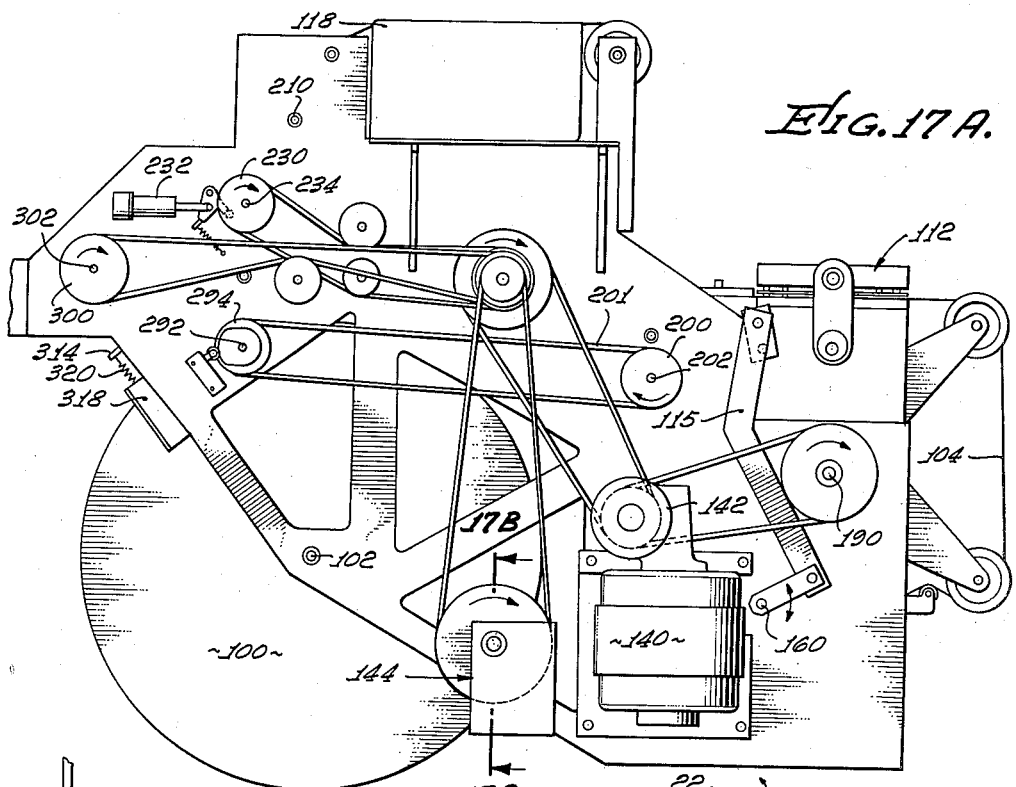
Figure 17B:
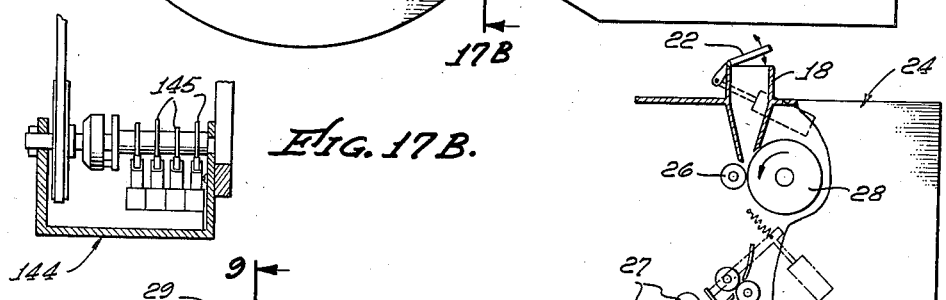
Figure 32:
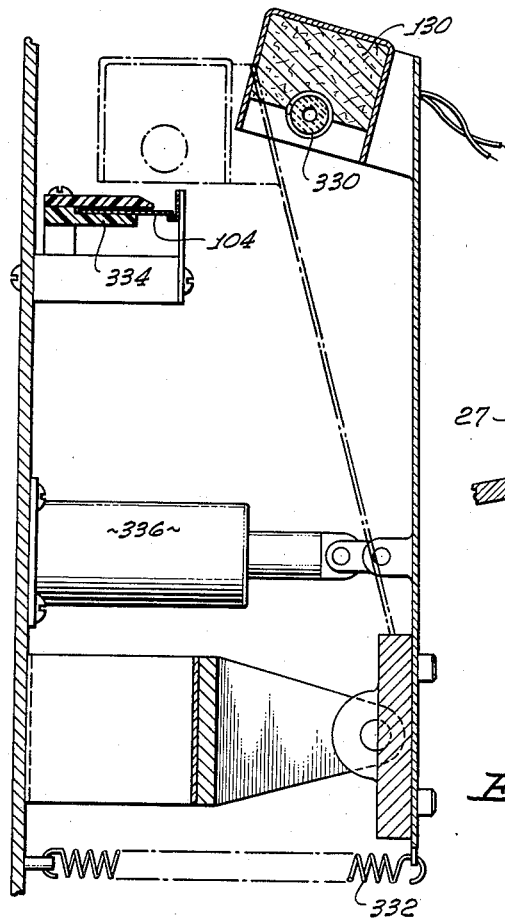
Figure 33:
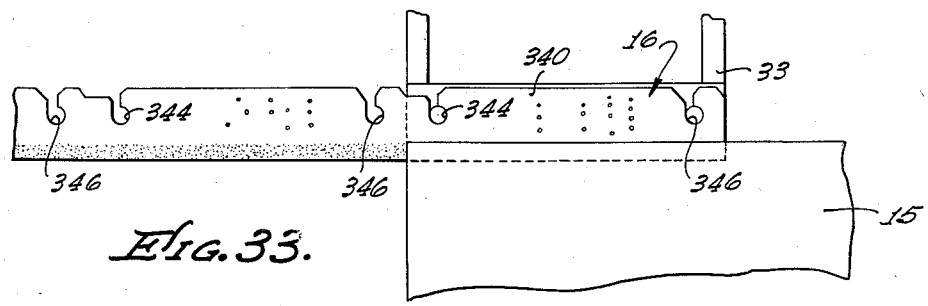
Figure 34:
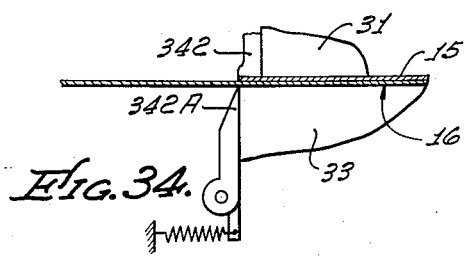
Figure 28:
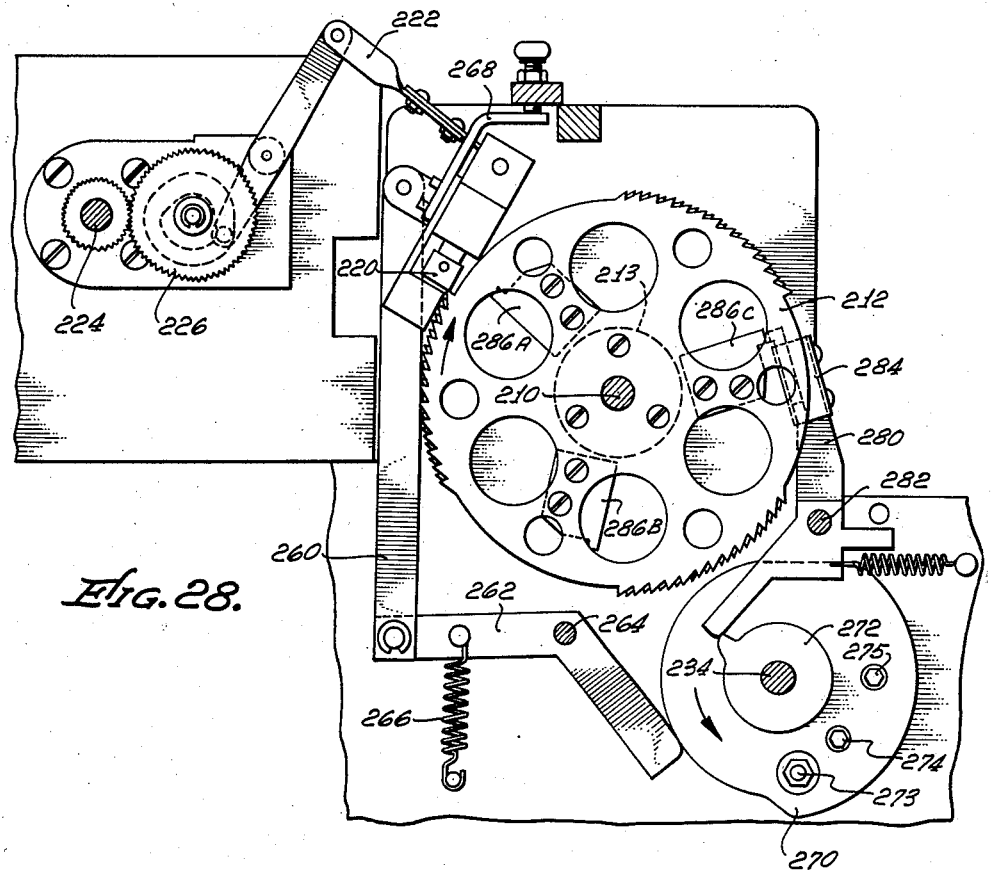
Figure 29:
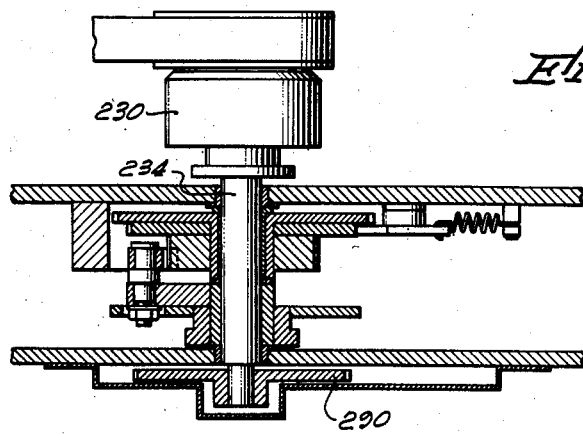

Figures 10, 11, 12, and 13 are details of apparatus for positioning the check accurately, after the drum has moved it away from the loading position;

Figure 14 is another side view of the drum and its actuating apparatus in conjunction with the actuating apparatus for the tab affixer;

Figures 15 and 16 are details of the tab-affixing apparatus showing how a tab is loaded on a cartridge;

Figure 17 is a front view of the embodiment of the invention without its case, showing the arrangement for pulling proper tape lengths and perforating it with the data derived from a check;

Figure 17A is a rear view of the tab-handling portion of the embodiment of the invention showing the drive mechanisms for deriving the proper timing for the tape transport apparatus;

Figure 17B is a section along the lines 17B in Figure 17A showing the arrangement for deriving electrical signals for timing various solenoid operations;

Figure 18 is a section along the lines 18—18 in Figure 17 and shows the tape break-detecting mechanism;

Figure 19 is another view of the tape break mechanism shown in Figure 17 taken along the lines 19—19 of Figure 17;

Figure 20 is a view along the lines 20—20 of Figure 17, showing the mechanism for perforating the guide holes in the tabs and also a section of the loop-former mechanism shown in Figure 17;

Figure 21 is a view along the lines 21—21 of Figure 17, showing the mechanism for looping the tape;

Figure 22 is a plan view of Figure 21;

Figure 23 is a view taken along the lines 23—23 of Figure 17 and shows the gauging-reel mechanism;

Figure 24 is a sectional view taken along the lines 24—24 in Figure 23, which shows the geneva-movement driving mechanism employed;

Figure 25 is a view taken along the lines 25—25 of Figure 26 and shows the details of the ratchet sprocket which is at the output of the flexowriter mechanism and successively pulls the tab and distance between data perforations;

Figure 26 is a view taken along the lines 26—26 of Figure 17 and shows the drive mechanism for the pull-through sprocket enabling the pulling of successive tab lengths (five inches for each tab);

Figure 27 is a view taken along the lines 27—27 of Figure 17 and illustrates in further detail the mechanism shown in Figure 26 comprising the pull-through sprocket for the tab after it has been operated on by the flexowriter;

Figure 28 is a view taken along the lines 28—28 of Figure 26 and shows further details of the pull-through sprocket;

Figure 29 is a horizontal section taken along the lines 29—29 in Figure 25. It shows the details of the mechanism employed to preserve the energy of the springs employed in the invention until required;

Figure 30 is a view of a section along the lines 30—30 of Figure 17, showing details of the single-revolution clutch used for pulling through given tab lengths;

Figure 31 is a view of a section along the lines 31—31 of Figure 30, showing details of the ratchet wheel operation;

Figure 32 is a view along the lines 32—32 of Figure 17. It shows the arrangement for heating the adhesive on a tab so that the tab may be affixed to a check;

Figure 33 is a section through lines 33—33 of Figure 17 and shows details of a heater used to soften the adhesive on the tab; and Figure 34 shows details of the tab and check being adhered to one another.

Referring now to Figure 1, there is shown a perspective drawing of the embodiment of the invention within its protective covers. The data-input device for this invention is a proof machine 10 of the type employed in banks. This proof machine 10 has a keyboard on which keys are depressed to enter the amount of a check and other identifying information, such as a depositor's account number, branch bank number, etc. These proofing machines are well known and are purchasable commercially. For example, a suitable type is made and sold by the National Cash Register Company of Dayton, Ohio.

In order to derive an electrical output from each key that is depressed, the machine is modified so that each key which is depressed closes a pair of contacts which are connected in a separate circuit. The leads from each pair of contacts are connected via the cable 12 to the embodiment of the invention 14 and to a paper-tape hole punch which is included therein. Thus, when any key is punched, it closes a circuit which causes a paper-tape punching machine to punch the number or character represented by the key in a binary code in paper tape. Arrangements of this sort are well known and the machine is commercially purchasable. The over-all system in which the embodiment of the invention is employed is one wherein a check 15, as shown in Figure 1A, which has been returned to a bank, has a tab 16 affixed thereto in order to afford automatic handling of the check. The tab has perforated therein the data which is employed in the automatic handling. The data is derived from the check. Since it is required to read the data on a check at least once, at that time, this data can then be entered into a keyboard and then punched into the tab 16. The tab is then affixed to the check removably. Subsequently, the information which is punched on the tab in a binary code may be read by information-machine-handling apparatus for the purpose of either performing accounting functions or sorting the checks so that they are collected in batches which are destined for one location.

The apparatus and invention described herein is the apparatus which performs the function of forming a roll of paper into suitable tab lengths, punching binary-coded data into the lengths derived from documents, such as checks, and then conveying these lengths to be aligned and mated with the associated check at equipment which seals or adheres the tab to the check.

The actual operation of the machine entails the following steps. An operator sits at the keyboard 11 and punches the keys to enter the required data into the machine. She then punches an operate key on the keyboard, which causes a lid over a chute 18 in the cover to lift so that the check 15 may be dropped into the apparatus. Inside the machine, the checks are successively aligned and brought to tab-affixing apparatus of the type described in the above-noted application for Tab-Affixing Apparatus. The rest of the machine perforates the data which was punched on the keyboard into the tabs and brings each tab up to the tab-affixing apparatus, which then affixes it to the check. The finished check and tab has the appearance shown in Fig. 1A. The finished checks are supported on a cartridge 19, which extends from the lower part of the apparatus. A suitable type of cartridge is described and claimed in an application for a Cartridge, by Peter Van Horne Serrell, filed September 20, 1954, Serial No. 457,238, and assigned to a common assignee.

Figure 2:
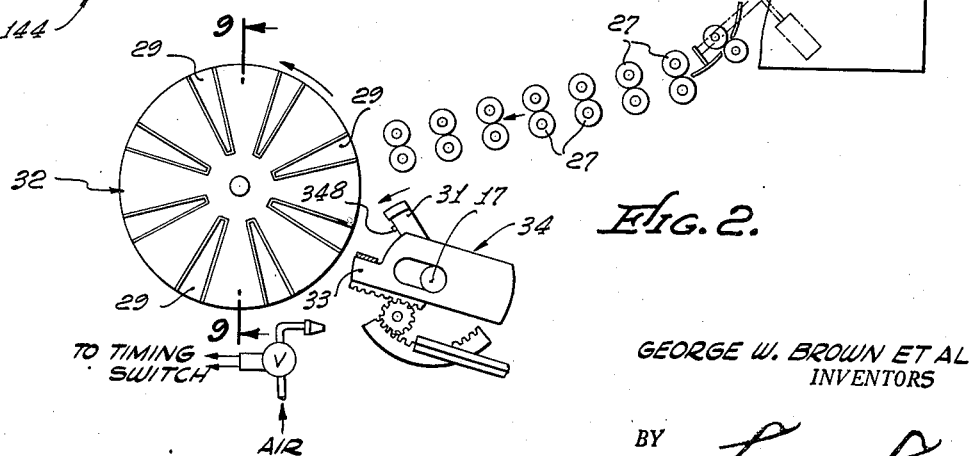
Figure 2 is an end view in diagrammatic form of the portion of the apparatus in the embodiment of the invention which receives an incoming check and transports it into drum apparatus which mates it subsequently with its associated tab.

Figure 2 is a schematic drawing of apparatus for handling a check once it is dropped inside the slot 18. The lid 22 is lifted by a solenoid (not shown) when the actuate key on the input machine 10 is depressed. The operator drops the check into the chute. The chute passes the check through a commercially available endorsing apparatus 24. This apparatus is used by all banks to show that the check has been processed by the bank. The endorser includes printing apparatus which prints the date of handling and the name of the bank on the check. The endorser, for the purposes of this invention, has two rollers 26, 28, between which the check passes. One of these rollers 26 is an inking roller, and the other roller 28 is a print roller, which prints the endorsing wordage upon the back of the check.

Figure 3:
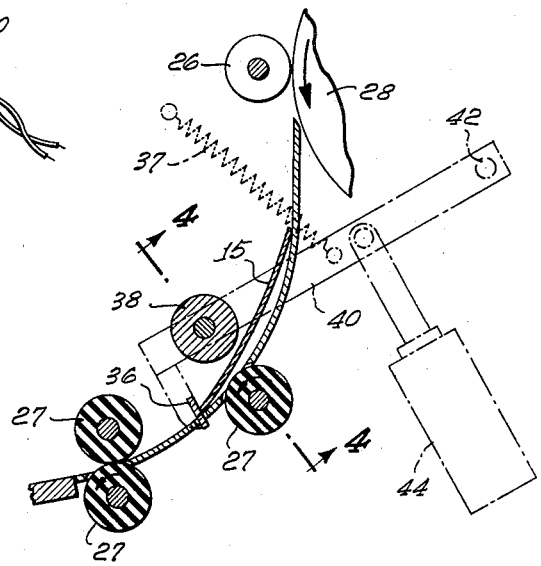
Figures 3 and 4 show the details of the aligning mechanism at the check-input portion of the embodiment of the invention.
Figure 4:
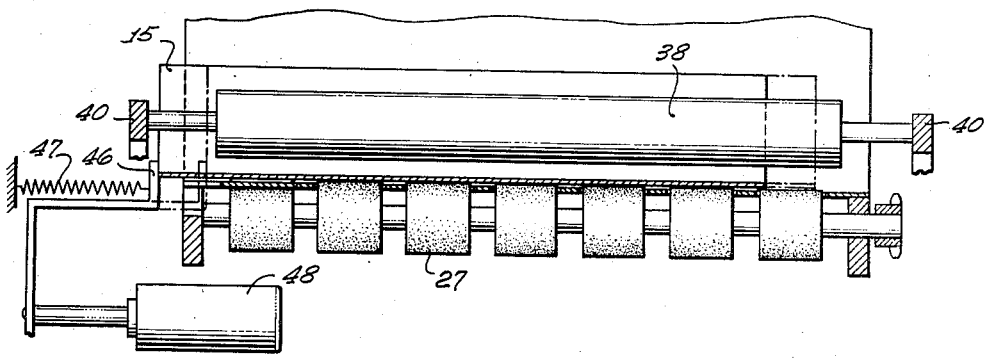

After the check has passed through the endorsing rollers, it is positioned by an alignment arm, shown in more detail in Figures 3 and 4, so that rollers 27 which follow may move the check into a pocket 29 of a drum 32. The pockets are formed by vanes. The drum 32 is shown in a somewhat schematic form here. The details are shown in Figures 5 through 14.

The drum is indexed around by a ratchet movement, which is timed with other operations to achieve the appropriate mating operation of check and drum. The position at which a pocket receives a check from the rollers 27 is known as a loading position. Tab-affixing apparatus 34 has an upper jaw 31 and a lower jaw 33. The upper jaw is actuated at the proper time to close on the lower jaw, thus affixing a tab to its associated check. The assembly then continues rotating, thus withdrawing the check from the pocket 29. Thus this constitutes an unloading position. The lower jaw then retracts, permitting the check to be loaded on the cartridge 19. In summary therefore, after the check is dropped into the chute 18, it passes by the endorsing apparatus 24, is aligned, and then passes through the series of rollers 27, which are rotating, and which urge it forward rapidly into an awaiting pocket in the check drum 32. The drum indexes around and finally presents the aligned check to the tab-affixing apparatus 34, which attaches a properly perforated tab to the check, withdraws the check from the pocket and loads it on a cartridge 19.

Figures 3 and 4 show details of the endorsing rollers and the preliminary check-alignment apparatus positioned beneath the input chute 18. Figure 4 is a view along the lines 4—4 of Figure 3, showing a check in position before being aligned. Because this invention has been designed to handle checks of varying sizes, it is necessary to preliminarily align each check which is dropped into the slot. As previously stated, after the check 15 is dropped into the slot, it passes between the two endorsing rollers 26, 28. It then comes to rest against a stop gate 36. This stop gate and an idler roller 38 are supported from a lever arm 40, which is fulcrumed at a point 42. A solenoid 44, operated by a timing switch (not shown) pulls down on the lever arm, thus removing the stop gate and bringing down the check-engaging roller 38, thus urging the check to continue in its passage. Before this, however, when the check comes to rest against the stop gate, an aligning arm 46 is actuated by a solenoid or single-revolution motor 48 to move inward against one end of the check 15 and align it so that it is properly positioned to be seized by the following rollers. The arm is then returned by the spring 47 driven back so that it is out of the way of the next check that may be dropped into the chute. After the check is aligned, the solenoid 44 pulls down on the lever arm so that the stop gate is moved out of the way and the idler roller 38 comes down against the top of the check and pushes it against the driver roller 27. This causes the check to be moved forward between the following rollers, as may be seen in Figure 2, until it is finally pushed or advanced into one of the pockets 29 of the drum. A spring 37 lifts the lever arm back to its original position when the solenoid 44 is released, thus repositioning the stop gate.

Figure 5:
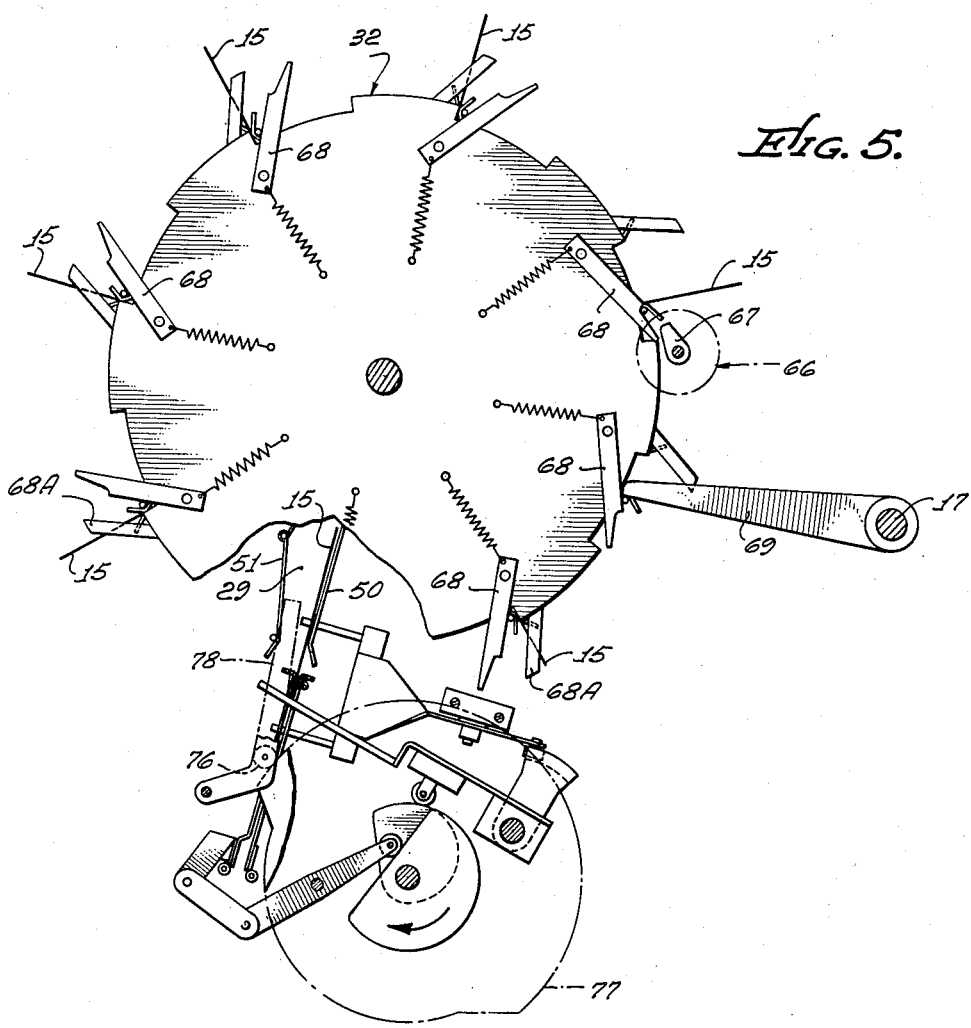
Figure 5 is an end view of the pocket drum showing the pocket opening and closing structures.

Figure 5 is a side view of the drum and associated pocket opening and closing apparatus as well as some details of check-aligning apparatus. A pocket is opened at three positions on the drum. The first is at the loading position where a check is inserted into the pocket. The second is at an aligning position where a check is moved to a position in the pocket so that its edge subsequently will line up with the edge of a tab. The third position is at the unloading position where a check is affixed and withdrawn from a pocket.

Figures 7 and 8 show the details of the vanes and preliminary check-aligning apparatus at the loading position of the drum. Each pocket is made of two vanes, a front vane 50 which is a single sheet with a flanged outer end and a back vane 51 made of two parts joined by a piano hinge and torsion spring 52 which urges the pocket closed as shown. A pin 53 is welded at the outer end of the back vane at the bend of the flange.

When a check 15 is loaded into a pocket from the rollers 27, wire fingers 54 are positioned as shown in Figure 7 to extend through holes in the vanes so that a check is stopped with its outer end extending well beyond the pocket ends. After a check is loaded, the fingers 54 are withdrawn to the position shown in Figure 8, the pocket closing meanwhile to hold the check in position. The drum then moves to bring the next empty pocket to the loading position and the fingers are moved again to the position shown in Figure 7.

The mechanism for moving the fingers includes a shaft 55 on which an L-shaped member 56 is pivoted and a spring 57 which urges the L-shaped member to the position shown in Figure 7. The fingers are supported from the L-shaped member and move therewith. One end of the L-shaped member has a pin 58 which extends through a slot in a lever member 59. The lever member has two pins 60, 61 mounted thereon and is reciprocally driven by a bell-crank arm 62 which is actuated from the same shaft 17 as drives the upper jaw or hammer 31 in the tab affixer (Figure 2).

A C-shaped member 63 is pivotably supported from a pivot 64. Its outside lower surface cams with pin 61 when the lever arm 59 is driven upward to assume the position shown in Figure 7 and a spring 65 assists in this camming action. The pin 60 cooperates with the inside lower surface of the C-shaped member to bring it to the position shown in Figure 8. The pin 58 at this position locks the C-shaped member in place with the fingers outside of the pocket while the drum rotates. The pin 61 kicks the C-shaped member out of the locked position at the proper time so that the fingers are inserted in the pocket again.

Figure 6:
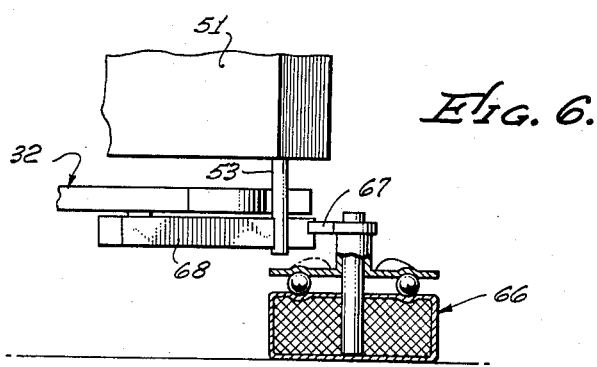
Figure 6 is a detail of the pocket closing structure shown in Figure 5.
Figure 9:
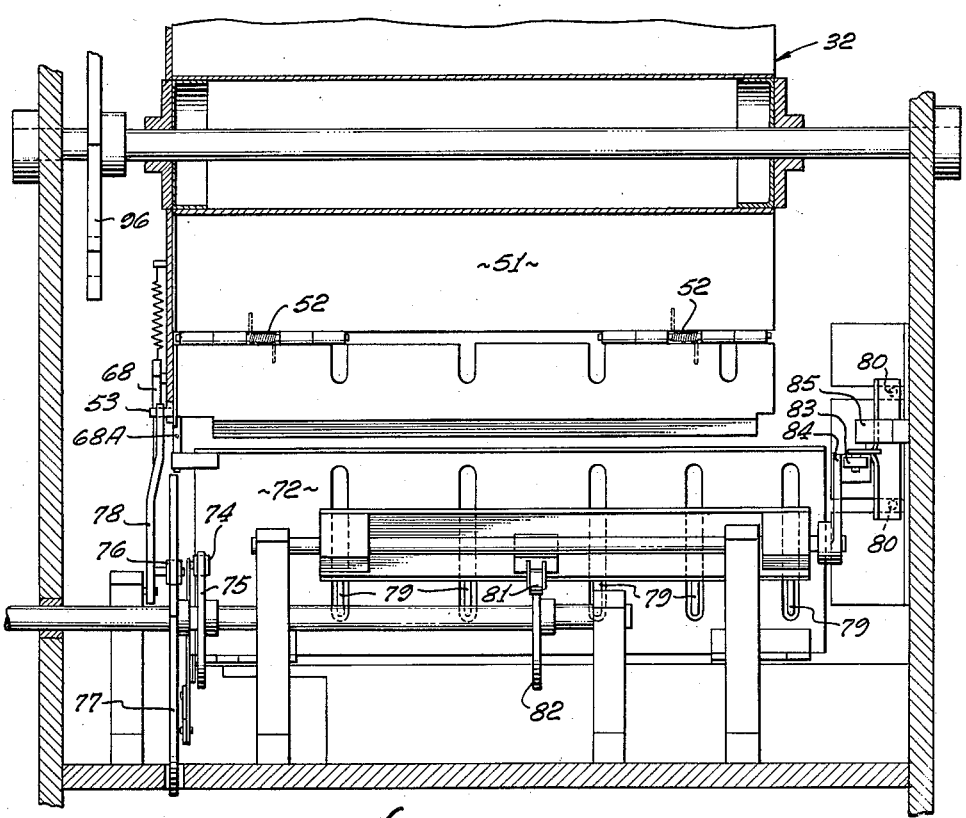
Figure 9 is a front sectional view of the drum along the line 9—9 of Figure 2.

As is seen in Figures 5 and 6, a rotary solenoid 66 operates at the proper time at the loading position to drive a lever arm 67. This arm strikes a latch member 68. The latch member has a notch which engages the pin 53, thus holding a pocket open. When the latch member is moved to disengage the pin 53, the spring-biased top-half of the back vane snaps closed, thus holding a check in position. As shown in Figure 5, there is a latch member 68 for each pocket, each of which is spring-biased to the extended position shown except for the portion of the drum travel between the unloading and loading position wherein it holds its associated pocket open. The opening of a pocket occurs when a pocket reaches the unloading position where the member 69 is rotatably driven from the tab-affixer shaft 17 to move the back vane toward the open position, whereby the pin 53 slides along the latch member 68 pivoting it back until the pin engages the niche in the end of the latch member at which position the pocket is held open.

After a pocket has been loaded and has been closed on a check, the drum rotates until the next empty pocket is at the loading position. Thus, each loaded pocket is advanced with the end of a check extending outside thereof, as shown in Figure 5, until the final aligning position is reached. At this aligning position, the sequence of operations which occurs is as follows: Apparatus which may be termed a book closes on the end of the check. Immediately thereafter, the pocket is opened so that the check may be moved further into the pocket and to a desired central position in the pocket for best alignment with the tab to be affixed thereto. Thereafter, the pocket closes and holds the check in the aligned position, the book opens and permits the drum to continue on its path without further interference with the check.

Figure 10:
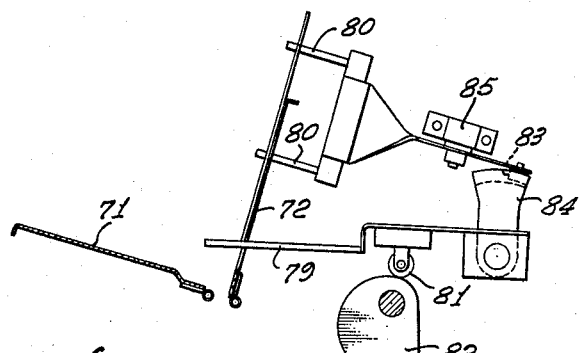
Figure 13:
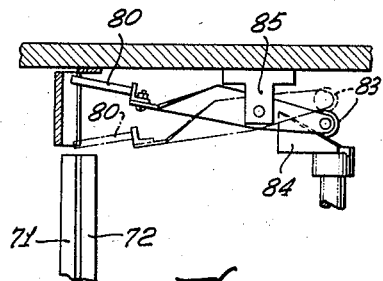

Reference is now made to Figures 5, 9, and 10 through 12, wherein are found details of this book structure. As shown in Figure 5, a check has already been positioned and the pocket is about to be closed. As shown in Figure 10, the book is in open position and is about to receive a check. The book consists of two leaves 71, 72, one of which is a front leaf 71 and the other is known as the back leaf 72. The back leaf 72 is spring-biased toward the position shown in Figure 10; the front leaf, however, is driven to the open position by a linkage member 73. This member is supported from pivots and driven from the cam-follower member 74, which follows the rotating cam 75. When the cam 75 rotates to the position shown in Figure 5, it releases the front leaf member 71, permitting it to close on a check end which extends from a pocket.

Figure 12:
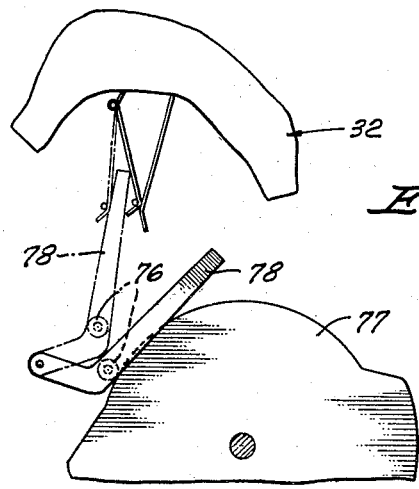

As seen in Figure 12, another cam-follower member 76 is actuated by a cam 77 so that it operates a linkage member 78 to open a pocket and permit the check therein to be properly guided while between the leaves of the book. The pocket is opened by the linkage member 78 being moved upward against the pin 53 on the back vane until a pocket opens. In effect, the two leaves of the book do not completely close on the check but have a small space therebetween so that they may hold the check and yet permit it to be moved. This may be seen in better detail in Figure 13, where the two leaves of the book are in the closed position yet a space remains between them. If the check is completely flat, it will drop down into the leaves of the book; if it is not completely flat but is wrinkled it will be held in position between the leaves of the book. At this point, when the check is held between the leaves of the book, a first set of fingers 79 and a second set of fingers 80 respectively move the check vertically and laterally to position the check properly for subsequent tab affixation. Fingers 79 are attached to move with a cam-follower roller 81 which follows cam 82. Fingers 80 are attached to move with a cam-follower 83, which follows cam 84. The fingers 80 are pivotably supported from the support member 85.

is permitted to close by withdrawing the member 78.

After the first and second set of fingers position a check by two of its adjacent sides, the pocket on the drum is permitted to close by withdrawing the member 78. After closing, a pocket holds the check in the aligned position. The drum then advances. As the drum advances, an arm 68A pushes the back leaf 72 out of the way of the end of the check still extending from the pocket.

Referring to Figure 5 again, the drum continues to advance with the check held positioned in the closed pocket until the tab-affixing position is reached. At this time, it is necessary to open the pocket so that the check can be withdrawn by the tab affixer. As previously described, this operation is provided by the member 69 operating in conjunction with the latch member 68.

Referring now to Figure 14, there may be seen the mechanism to enable the drum rotation, and the operation of fingers 54, and book in a proper time sequence with the tab affixer. A single-revolution clutch 90 is employed to drive all the cams 75, 77, 82, 84 which actuate the book. A single-revolution clutch 92 is employed for operating the tab-affixing mechanism through the bell-crank rod 94. Solenoids 91 and 93 are excited at the proper times to actuate the single-revolution clutches. The drum advances in synchronism with the tab-affixing apparatus by means of the ratchet wheel 96 and the pawl member 98, which is driven from the bell-and-crank arm 94 which simultaneously drives the tab-affixing apparatus. The motor 95 supplies the motive power for the single-revolution clutches. Timing signals for synchronization of the portions of the equipment which delivers a tab with data perforated therein to the tab affixer and the drum is derived by means of cams, shown in Figure 17B.

Figure 11:
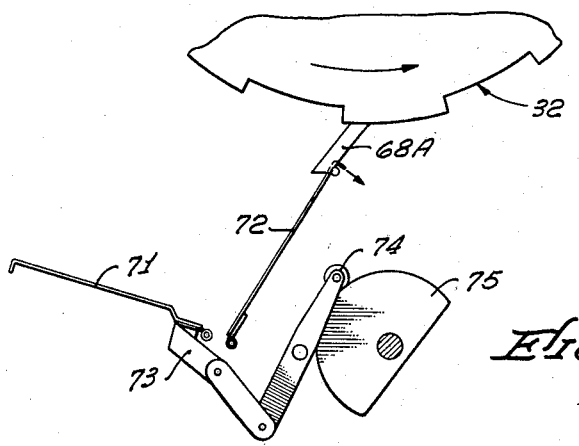

Reference is now made to Figure 17 of the drawings, which shows an over-all view of the arrangement included in the embodiment of the invention whereby paper tape is pulled from a reel, has guide holes punched therein, and is then perforated with the code which indicates the information derived from a check. The tape is then brought to the tab affixer 34, where it is attached to the check from which its data was derived. The paper tape 104, from which tabs are made, is wound on a reel 100. This reel is rotatably mounted on a shaft 102. The tape 104 is fed from the reel through a roller 106 and opposed microswitch 108, whereby the end of a reel of tape or a break in the tape may be detected. The details of this arrangement are shown in Figures 10 and 11 and will be described subsequently.

The tape is next pulled by a loop-making mechanism consisting of a lever arm 109 which carries rollers and is actuated in a manner to be shown in more detail in Figures 20 through 22, which are discussed subsequently. The loop-forming mechanism pulls a given length or loop of tape from the reel. A brake 110 is employed to prevent the tape from being pulled backwards onto the reel. The details of the brake are also shown in Figures 20 and 22. The tape then passes over a number of rollers to gang punch 112, which also is shown in more detail in Figure 20. This gang punch serves the function of punching the guide holes, or holding openings in the tab which are on either side of the field on the tab in which data holes are punched. The tape then passes from under the punch over a gauging reel 114, the details of which are shown in Figures 23 and 24. The gauging reel serves the function of pulling the length of one tab from under the gang punch. The tape which is guided around the gauging reel 114 by a shoe 116 then is led to the flexowriter head 118, which serves the function of punching the information derived from a check into the tab. In the flexowriter head there is provided a suction nozzle 119 leading to a jar 120. Vacuum is supplied to the jar employing the motor 122 which drives the pump 124. This serves the purpose of pulling the paper pellets caused by perforations in the paper tape into the jar, thereby preventing the possibility of any jamming resulting from an accumulation of the pellets.

The tape is then advanced from under the paper-tape punching head around a sprocket wheel 126, which serves the function of advancing the paper tape in successive increments a distance equal to the space between the data holes punched in the tape and then, when the last data hole is punched in the tape, it advances it sufficiently to bring the data-punching portion of the succeeding tab into the paper-tape punching head. The details for this operation are shown more clearly in Figures 25 through 29.

The tape is led by guide means over another sprocket wheel 128, which serves the function of feeding a single tab length to a heater 130. The driving mechanism for the sprocket wheel 128 is shown in more detail in Figures 30 and 31. The tape is treated in advance with an adhesive which may be thermo activated. This adhesive is used to cause the tab and check to adhere to one another. From the heater the tab is thrust into the tab-affixer apparatus, which has been described previously.

Figure 17A is a rear view of the tape-handling apparatus showing the arrangement of driving belts required for securing the timing for the various steps performed in the handling of the tape. There is also shown a driving motor 140 which energizes or powers the entire arrangement. The motor drives a pulley 142 and the pulley, by means of belts, drives other pulleys and also a timing sequencer 144, which is responsible for driving cams 145 which provide signals for timing the solenoid operations actuating the various controls already described and to be described.

Reference is now made to Figures 18 and 19, which show the details of the end-of-tape or break-in-tape detector. Figure 18 is a view along the lines 18—18 of Figure 17. There may be seen a roller 106 having a groove in its center. A microswitch 108 has its sensing arm 154 located so that it will enter the groove of the roller 106 and close a warning circuit except when there is paper tape 104 which bridges this groove and thus prevents the entering into it. Figure 11 shows a top view of the same arrangement with the tape 104 passing between the switch 108 and the roller 106. Obviously, if the tape breaks or runs out, it is not desirable to keep feeding checks and check information to the apparatus, and thus the necessity for the warning device.

Figure 20 is a view taken along the lines 20—20 of Figure 17. This shows a cross section of the loop-making arrangement. Referring also to Figure 21, which is a section along the lines 21—21 of Figure 20, there may be seen a pivot 160; the loop-maker arm 109 is represented by the dotted lines in this view. Three rollers are mounted on the loop-maker arm, respectively numbered 162, 164, and 166. As may be seen in Figure 17A and Figure 20, the loop-making arm 109 is driven by a bell-crank arm 115 from the gang punch 112 through a power takeoff 113. As may be seen in Figures 20 and 21, when the arm 109 pivots about the pivot point 160, the roller 162 is moved upward and the roller 164 is moved downward, thereby pulling a loop in the tape.

Mounted on the pivot 160 is a cam 170. This cam has an indentation in its periphery. In the indentation there rides a roller 172, or cam follower, which is pivotably mounted on an arm 174. This arm is pivoted on a shaft 176. To that shaft is also rigidly mounted another arm 178. The arms 174 and 178 are pulled down by a spring 180. Thereby, in the position shown, with the cam follower 172 in the depression in the cam, the arm 178 is held above and permits the passage of the tape over a pad 182. When the arm 109 is rotated, the cam 170 rolls therewith, thereby forcing upwards the arm 174 and downwards the arm 178, so that a tip 184 is pressed against the tape which is between the tip and the pad 182. Thus, when the rollers 162 and 164 are in operation pulling a loop into the tape and thereby applying tension to the tape, the brake serves to prevent any feedback or backpull on the remaining part of the tape extending beyond the loop-forming mechanism which could destroy the critical registration which is required in the subsequent portion of the apparatus. It should be noted that more than a single tab length is pulled by the loop-forming mechanism in order to provide a margin of safety in subsequent operation.

Figure 22 shows a top view of the loop-forming mechanism. This top view is taken along the lines 22—22 in Figure 21. The disposition of the rollers 162, 164, 166 and the cam 170 relative to the pivot point 160 may be more clearly seen there.

As may be seen in Figure 20, the power input for the gang-punch mechanism comprises a shaft 190, which, as may also be seen in Figure 17A, is driven from the driving motor 140 for the system. The shaft 190 via a belt 192 drives a single-revolution clutch 194. The single-revolution clutch actuates the gang punch through one operation to punch out the guide holes in the paper tape and also drives the loop-forming device through the bell crank 115.

Reference is now made to Figure 23, which is a view along the lines 23—23 in Figure 17. Figure 23 shows the structure for operating the gauging-sprocket wheel 114, which pulls one tab length through the gang punch. This operation occurs after the tab has been punched by the gang punch 112. The sprocket wheel 114 has a guide 116 over it. The guide is suspended on a pin 117, so that it is free to be moved when required. The driving mechanism for the sprocket wheel 114 is shown in Figure 24. As seen in Figure 17A, power therefor is received by means of a belt 201, from other driving means, which drives a wheel 200. The wheel, or roller, 200 drives a shaft 202. On the shaft 202 there is mounted a geneva 204. The geneva meshes with a Maltese-cross gear 206. This is mounted on a shaft 208. This shaft, in turn, drives the sprocket wheel 114.

As previously described, after being pulled by the measuring sprocket wheel 114, the tape is looped up to the tape punch or flexowriter punching head 118. This flexowriter punching head machine is commercially purchasable. It serves the function of perforating in the tape the data which was derived from the check via the keyboard of the input machine. The tape is pulled through the writer punching head by the indexing wheel 126. The details of this and its drive mechanism are shown in Figures 25 through 29. Referring first to Figure 26, which is a section through the wheel 126 taken along the lines 26—26 in Figure 17, the indexing wheel 126 carries the tape by means of pins which mesh with the guide holes which are punched into the paper tape by the gang punch 112. A shoe 127 serves to press the paper tape against the roller 126 to keep it continuously in mesh therewith. The sprocket wheel 126 is mounted on a shaft 210. On the shaft 210 there are mounted two ratchet wheels 212 and 214. These two ratchet wheels are shown in more detail in Figure 28. As may be seen in Figure 28, they are mounted on the shaft so that the teeth on one are spaced half-a-tooth distance away from the other. A biasing spring 216, also shown in Figure 25, which is a view taken along the lines 25—25 of Figure 26, serves the function of urging the two ratchet gears 212, 214 in the direction shown by the arrow in Figure 28.

Supported above these two ratchet gears is a walker-member 220 (Figure 20). This walker-member has imparted to it a rocking motion in the direction of the hub 213, upon which the two ratchet gears are mounted. The two ratchet gears thereby are given an escapement type of rotation, since the walker will move from one tooth on one ratchet gear to the adjacent tooth on the second ratchet gear, thereby releasing the first ratchet gear. This rocking motion of the walker 220 is actuated through a cam-operating mechanism 222, which, in turn, is driven from the tape-writer punching head machine. A central shaft 224 in the tape-writer punching head machine rotates one single revolution for each row of information holes which are punched in the paper tape. This rotary motion is communicated to a gear 226 which is in the ratio of one to two with the shaft 224. This gear 226 thus rotates half a revolution for the one revolution of the shaft 224. A compulsory camming arrangement is built on the side of the gear 226 and thereby it communicates the rocking motion via the arms 222 to the walker-member 220.

From the drive pulley 142 (Figure 17A) via belts, motion is translated to a single-revolution clutch 230. This clutch is triggered by a solenoid 232. The single-revolution clutch 230 is mounted on a shaft 234 (Figures 27 and 29). Referring now to Figure 25, the shaft 234 has mounted on it a driver segment 238. This driver segment has a pawl 240 pivotally attached thereto by a pivot 242. The pawl is biased by a spring 244, so that one end of it will be forced outward and the other end, which is the working end, is forced inward toward the shaft 234. What is desired to be effectuated here is that for every revolution of a shaft 234 half of that revolution is made available for energizing the subsequent equipment without having gear chatter. The pawl 240 is driven from the shaft 234 and makes one single revolution therewith. In rotating, the pawl has its outer end ride against an outer cam 246 for a portion of an arc. During this portion of its travel, its inner end is moved and held outward. Otherwise, its inner end is biased and held inward by the spring 244.

A cam 248, a second cam 250, and a gear 252 are pinned together and are all mounted to be freely rotatable on the shaft 234. Cam 248 serves the function of transferring motion from the pawl 240 to the gear 252. Cam 250 serves the function of preventing any backward revoltion and is therefore known as the backstop cam. The backstop lever 254 is spring-biased to be forced against the cam 250 at all times. Accordingly, to follow through on the description, when the sector 238 is rotatably driven, the pawl 240, when it is not moved against the outer cam 246, will engage the notch in the inner cam 248 and carry it along with it. As soon as the pawl 240 engages the outer cam 246, it is moved out of engagement with the inner cam 248, whereby the drive upon the gear 252 is terminated. It will thus be seen that since the length of the outer cam 246 is only over one-half of the complete arc of the circle, the drive to the gear 252 is half of the drive which is received from the shaft 234. It should also be remembered that the shaft 234 is driven from a single revolution clutch and, therefore, it only rotates one revolution at a time.

A gear 255 is rotated in response to the rotation of the gear 252. The hub end of the spring 216 is attached to this gear. The other end of the spring 216 is pinned to the two ratchet gears 212 and 214. This may better be seen in Figure 25. Therefore, the spring 216 is always wound but never too tightly wound, and, accordingly, is maintained in the substantially same range of spring tension at all times.

Reference is now made to Figure 28, wherein there is shown the apparatus for properly rotating the indexing wheel for pulling the tape from underneath the punching head as it is receiving the data by way of the operation of the punch head. The ratchet gears 212, 214 have the same number of teeth as the maximum number of holes which can be punched along a single tape length. In the normal operation, the full complement of holes are perforated and the machinery operates so that the gears 212 and 214 will be stepped along while the holes are punched in the tape and then come to the space where there are no teeth. At this time, the gears will rotate through this space, which is sufficient to pull the succeeding tab into the paper-punch apparatus.

It should be noted that provision is made on the ratchet gears for three tab lengths by means of three sets of teeth on each of the ratchet gears 212, 214. Thus the gears are divided into three sectors. However, it often happens that less than a complete field, as it may be called, of perforations are required in a tab. When this happens, the walker is not actuated past the last perforation. It is therefore necessary to remove the walker and permit the gears to rotate until the next tab is drawn into the perforating punch head. The apparatus to be described performs this function. The walker is held against the ratchet gears through linkage arms 260, which, in turn, are pivotally connected to a lever arm 262. The lever arm is pivoted at a pivot point 264 and is held biased by a spring 266 so that the walker is held against the ratchet gears. In order to insure the proper alignment of the walkers, as well as their engagement with the teeth, a stop, or holding arrangement 268, which is adjustable is provided. The lever arm 262 also serves as a cam follower and is urged against a cam 270.

The cam 270 is attached to a second cam 272, which, in turn, is attached to the pawl-driving sector 238 by bolts 273, 274, and 275. Accordingly, since the driving sector 238 is keyed to the shaft 234, it rotates a single revolution when driven by the single revolution clutch. The cam 270 has its cam surface shaped so that it will press against the lever arm 262 during the time that it is desired that the walker be removed from the teeth on the ratchet gears. The cam surface urges the lever arm 262 downward, whereby the linkage mechanism 260 forces the walkers away from the ratchet gears 212, 214.

A brake lever arm 280 is pivoted at a point 282. This brake lever arm has at one end a stop mechanism 284 and at the other end is a cam follower on the cam 272. The stop mechanism engages a lip on one of three stops 286A, 286B, and 286C. The end of the stop arm 280, which engages these stops, is made of a soft material which serves as a shock absorber. The stops are positioned at three points in the rotation of the ratchet gears, which is such that the ratchet gears are stopped with the walker suspended just before the first tooth of each one of the three sectors of the ratchet gears. The cam 272 and the cam 270 are both shaped so that they respectively operate their cam-follower members so that the walker is swung away from the ratchet teeth and the stop member is permitted to pivot towards the center of the shaft 210 upon which the ratchet teeth are mounted, so that the stopping action will take place first before the walker member is permitted to be lowered toward the ratchet gears just before the first tooth of the sector. In this manner, the operation of the system is such that the walkers are removed from the sector teeth, even though a full field has not been punched into the paper tape, and they are held away from the sector teeth until the next sector is rotated in place. Then they are lowered to begin again the next cycle of advancing the paper tape sufficiently to insure that a field is punched thereinto.

The method of driving the Geneva shown in Figure 24 can now be described in more detail. In Figure 29 it will be seen that the shaft 234 is driven from the single-revolution clutch 230. On the other end of this shaft is a gear 290, which is attached to be rotated with the shaft. Figure 27 shows how a gear train is used to communicate the single revolution of the gear 290 down to a shaft 292. The shaft 292 has a pulley and belt sprocket 294 mounted thereon. Referring again to Figure 17A, the belt sprocket 294 communicates with the shaft 202 by means of a timing belt 201.

After the indexing gear 126, the tape 104 loops around to a tape-sprocket gear 128, which serves the function of pushing one tab length into the heater 130. The drive for this unit is provided via the belts shown in Figure 17A to a drive roller 300. This has a shaft 302, which is rotated therewith. Figure 30 is a sectional view of this sprocket-gear-driving mechanism taken along the lines 30—30 of Figure 17, and Figure 31 is a view along the lines 31—31 of Figure 30. In Figure 30, the pulley 300 and the shaft 302 are continuously rotated. Mounted on the shaft 302 is a collar 304, which rotates therewith. This collar serves as a stop for compression spring 306, which is forced against a second collar 308. Thereby, collar 308 is made to rotate with the collar 304, but can also move along the direction of the shaft 302. This collar 306 presses against a felt pad 309 and another felt pad 310. Between these felt pads is a driven member 312. What has been effectively described thus far is a slip-clutch arrangement whereby the member 312 can be driven or can be held stationary. As may better be seen in Figure 31, the driven member 312 has two notches in its periphery. The reason for this is because it is desired to drive the sprocket wheel 128 one-half revolution for every single revolution of the shaft 302. This should not be construed as indicating that the gear 128 is continuously driven. The driven member 312 is released when desired by a trigger member 314. This trigger member is pivoted on a pivot 316. The release of the trigger member 314 is performed by a solenoid 318, which is properly timed with the rest of the mechanism to perform its operation at the time a tab is required to be adhered to a check. A spring 320 serves the function of biasing the trigger arm 314 towards the driven member 312.

Figure 32 is a section along the lines 32—32 of Figure 17. It shows the heater 130 which includes an electrical element 330, which is kept at a suitable temperature for softening the thermosensitive adhesive with which a tab is coated (initially when in tape form) so that it will adhere to a check. The heater element is pivotally supported as shown and biased by a spring 332 so that normally it is swung outward in the position shown by the heavy lines. When a tab is inserted between the guides 334, a solenoid 336 is energized thus pulling the heater to the position shown by the dotted lines whereupon it softens the adhesive on the tab.

Referring back to Figure 17, the tab is next guided and positioned on the lower jaw of the tab affixer 34, which then operates to press tab and check together as shown in Figures 33 and 34. The tab and check have one of their ends aligned and the data-bearing portion of the tab 340 extends over the edge of the check so that its binary code can be read. The tab affixer carries a knife 342 at one edge of the upper jaw so that when it descends to affix tab and check it cuts off the tab against its mating knife edge 342A, which is spring-loaded towards knife 342.

Notice should be taken of the guide holes 344, 346 in the tab. The tab and check are carried by these holes. Furthermore, as shown in Figure 15, when the upper jaw 31 descends it carries spring-loaded pins 348, which enter these guide holes so that when the lower jaw is retracted as shown in Figure 16 the tab is carried by these spring-biased pins up to the cartridge 19. The cartridge has rails which are opposite the pins, so that the tabs may be pushed by the slight abutment on the lower jaw onto these rails while the pins are retracted out of these holes by the pressure of the guide rails. Further details of this tab-affixer operation are found in the previously mentioned application for a tab affixer.

The system described herein is one wherein a tab is made from tape. The tape is on a reel. Lengths are drawn from the reel. First pairs of guide holes are punched in these lengths and then coded data derived from an information-bearing document is inserted in the space between the guide holes. The tape is then advanced in tab lengths past a heating element which activates an adhesive which is on one side of the tape. After the heating element is what may be termed the tab-affixing position which is on the lower jaw of the tab affixer. At this position the tab length is affixed to the document, from which its coded information was derived, in a manner so that the data holes are not obscured by an edge of the document and the adjacent edge of the document is aligned with the edge of the tab.

The data from the document is entered into the code-punching apparatus by a keyboard. The document is then inserted into the system and transported to the tab-affixing position to have the proper tab affixed thereto. This transport apparatus includes a passageway which is defined by pairs of rollers. A pocket drum is rotatably positioned at one end of the passageway. The document is dropped into the other end, is preliminary aligned for passage into a pocket, and is endorsed by a printer, if desired. The pocket drum indexes so that its pockets are successively positioned at the other end of the passageway to receive successive documents therefrom.

Fingers are actuated to be inserted in a pocket to prevent the document being inserted from going to the bottom. The fingers are then withdrawn, and the pocket is closed. The drum then carries the document to what may be termed an aligning position. Here a pocket is opened and two leaves form a book to loosely hold a document. Horizontal and vertical moving members then position the document properly by pushing on two adjacent edges. The pocket is then permitted to close, holding the document in its aligned position. The drum continues to index until the tab-affixing position is reached where the lower jaw of the tab affixer comes under the edge of the document which is extending out of the pocket, and the pocket is then opened to permit the withdrawal of the document by the tab affixer. The motion of the drum after receiving a document and the advance of a tab after having the data from that document punched therein are carefully co-ordinated by means of timing cams and other apparatus operated therefrom so that a mating of a document and its associated tab at the tab-affixing position is accomplished.

There has accordingly been described and shown herein a novel and useful apparatus for forming a tab with data therein derived from an information-bearing document and transporting that document to a position at which the tab is affixed thereto.

We claim:

1. In a system for affixing a tab to an information-bearing document means for forming said tab including a reel of tape having a thermosensitive adhesive on one side, means for pulling lengths of tape from said reel, means for punching spaced guide holes along said tape, means for pulling said tape lengths through said guide-hole punching means, means for punching coded data derived from said document into said tape between a pair of guide holes, means for pulling said tape through said means for punching coded data, a heating position for the thermosensitive adhesive on said tape, and means for advancing by said heating position to a position for affixation to said document tab lengths of said tape which have been pulled from said means for punching coded data.

2. In a system for affixing a tab to an information-bearing document means for transporting a document from which information for a tab to be affixed thereto has been derived to a position of affixation to said tab comprising a plurality of roller means defining a passageway through which said document is transported, said document being inserted into one end of said passageway, a drum rotatably supported at the other end of said passageway, said drum including a plurality of pockets, means for rotatably indexing said drum to position said pockets successively at the other end of said passageway for receiving successive ones of said documents therefrom and thereafter at a position at which a tab is affixed to its associated document, finger means, means to insert said finger means in the one of said pockets at said other end of said passageway to prevent a document from going to the bottom of a pocket and to thereafter withdraw said finger means, means to close said pocket, means to position a document in a pocket for alignment with a tab to be affixed thereto, and means for opening said pocket when it reaches said position of affixation.

3. In a system as recited in claim 2 wherein each pocket includes a first and a second vane member forming a V with the apex of said V being held at the hub of said drum, said second vane member being made of two pieces, a hinge joining said two pieces, and a spring biasing the outer one of said two pieces to close the opening of said V.

4. A system as recited in claim 3 wherein said means to position a document in a pocket for alignment with a tab to be affixed thereto includes means for opening a pocket, book means for supporting said document when said pocket is opened, means for moving said document to an aligned position by two of its adjacent edges, and means for withdrawing said means for opening a pocket whereby said pocket closes to hold said document in its aligned position.

5. In a system for affixing a tab to an information-bearing document means for forming said tab including a reel of tape, means for pulling lengths of tape from said reel, means for punching pairs of guide holes at spaced distances along said tape lengths, means for perforating data in coded form in the space between a pair of guide holes, said data being derived from the information on said document, and means for advancing a tab length of said tape including a pair of guide holes and the coded data therebetween to a position for affixation to an edge of the document from which said data was derived; means for carrying said document to said position for affixation with said tab including a drum having a plurality of pockets, means for loading said document into one of said pockets, means for indexing said drum rotatably, means for retaining said document in said pocket as said drum rotates, and means for positioning said document within said pocket to present a properly positioned edge for affixation to said tab at said position for affixation.

6. In a system as recited in claim 5 wherein said means for loading said document into one of said pockets includes a passageway having one end terminating at said pocket drum and defining a loading position therewith, said document being inserted in the other end of said passageway, means at said other end for aligning said document with a pocket on said drum at the other end of said passageway, and roller means along said passageway for advancing said aligned document through said passageway and into a pocket at said loading position.

7. In a system as recited in claim 6 wherein there is positioned at said one end of said passageway a plurality of wire fingers, means for rotatably mounting said wire fingers, means for inserting said fingers into a pocket of said drum at said loading position to prevent a document from being completely inserted into said drum, and means for withdrawing said fingers from said pocket after a document has been loaded therein.

8. In a system as recited in claim 5 wherein said means for positioning said document within said pocket to present a properly positioned edge for affixation to said tab includes means for opening a pocket, book means for supporting said document when said pocket is opened, means for properly positioning said document by two of its adjacent edges, and means for withdrawing said means for opening a pocket whereby said pocket closes to hold said document in its aligned position.

References Cited in the file of this patent

UNITED STATES PATENTS

| | | |
|---|---|---|
| 1,150,784 | McMillan | Aug. 17, 1915 |
| 2,262,919 | Bruker | Nov. 18, 1941 |
| 2,521,435 | Wockenfuss | Sept. 5, 1950 |
| 2,692,539 | Houghton | Oct. 26, 1954 |